(12) United States Patent
Rauscher et al.

(10) Patent No.: US 8,438,966 B2
(45) Date of Patent: May 14, 2013

(54) DEVICE AND PISTON FOR SEGREGATING ARTICLES

(75) Inventors: Guenter Rauscher, Pfatter-Geisling (DE); Bernhard Duenzinger, Unterdeggenbach (DE)

(73) Assignee: Krones AG, Neutraubling (DE)

( * ) Notice: Subject to any disclaimer, the term of this patent is extended or adjusted under 35 U.S.C. 154(b) by 923 days.

(21) Appl. No.: 12/584,310

(22) Filed: Sep. 3, 2009

(65) Prior Publication Data

US 2010/0070096 A1 Mar. 18, 2010

(30) Foreign Application Priority Data

Sep. 3, 2008 (DE) .......................... 10 2008 045 568

(51) Int. Cl.
*F16J 9/26* (2006.01)
*F16J 10/04* (2006.01)

(52) U.S. Cl.
USPC .............................. 92/246; 92/170.1; 92/248

(58) Field of Classification Search ............. 92/155, 92/169.1, 170.1, 171.1, 246, 248; 91/415, 91/416
See application file for complete search history.

(56) References Cited

U.S. PATENT DOCUMENTS

| | | | | |
|---|---|---|---|---|
| 2,877,070 A | | 3/1959 | Lee ................................ 309/23 |
| 3,023,739 A | * | 3/1962 | Dickson, Jr. et al. ............ 91/355 |
| 3,745,890 A | | 7/1973 | Costarella ....................... 92/192 |
| 3,902,405 A | * | 9/1975 | Costarella et al. ............... 92/246 |
| 4,674,397 A | * | 6/1987 | Wilcox ....................... 91/417 R |
| 6,415,706 B1 | * | 7/2002 | Poschl et al. ..................... 92/248 |
| 7,399,435 B2 | | 7/2008 | Dunzinger et al. ........... 264/40.1 |
| 7,481,150 B2 | * | 1/2009 | Lofink, Jr. ....................... 92/246 |
| 2004/0159586 A1 | | 8/2004 | Dunzinger et al. ............. 209/11 |

FOREIGN PATENT DOCUMENTS

| | | |
|---|---|---|
| DE | 21 13 392 A | 10/1971 |
| DE | 27 04 614 C2 | 8/1978 |
| DE | 27 37 887 C3 | 3/1979 |
| DE | 28 47 274 C2 | 1/1983 |
| DE | 32 04 114 C2 | 8/1983 |
| DE | 34 32 000 C2 | 3/1986 |
| DE | 36 31 879 A1 | 8/1988 |
| DE | 94 07 563 U1 | 6/1995 |
| DE | 195 16 403 C2 | 11/1995 |
| DE | 199 25 083 A1 | 12/2000 |
| DE | 201 14 032 U1 | 10/2002 |
| DE | 102 59 589 B3 | 4/2004 |
| EP | 1 079 120 B1 | 2/2001 |
| GB | 131 68 41 | 5/1973 |
| GB | 2033537 | 5/1980 |

OTHER PUBLICATIONS

Brief Translation of DE 27 37 887 C3, 1 page.

* cited by examiner

*Primary Examiner* — Michael Leslie
(74) *Attorney, Agent, or Firm* — Davidson, Davidson & Kappel, LLC

(57) ABSTRACT

A device and a piston for segregating articles is being disclosed. The device encompasses a segregating element comprising at least one cylinder with a cylinder housing and a piston installed in the cylinder that has at least one valve. A medium can be fed into and discharged from the cylinder via at least one line. The at least one valve interacts with the at least one line so as to create a hard sealing, and a housing sealing element interacts with a piston sealing element so as to create a hard sealing. The piston can used in a device for segregating liquid containers.

20 Claims, 3 Drawing Sheets

DEVICE AND PISTON FOR SEGREGATING ARTICLES

This claims the benefit of German Patent Application No. 10.2008 045.568.7 filed on Sep. 3, 2008 and hereby incorporated by reference herein.

The invention relates to a device for segregating articles. In particular, the invention relates to a device for segregating articles from a plurality of articles on a conveyor belt. In this process, the plurality of articles passes a detection unit in a conveying direction of the conveyor belt. The conveyor belt is associated with a segregating element comprising at least one cylinder with a cylinder housing and a piston installed in the cylinder that has at least one valve. By means of a control unit, a medium can be fed into and discharged from the cylinder via at least one line. The at least one valve and the at least one line interact with each other so as to create a hard sealing. The piston can be moved into and out of the cylinder in a piston direction along a sliding surface of the cylinder housing. A hard-sealing housing sealing element is arranged on the sliding surface of the cylinder housing, and a piston sealing element is arranged on the piston.

Moreover, the present invention also relates to a method for employing the piston in a device for segregating liquid containers.

BACKGROUND

Liquid containers such as bottles or beverage cans are produced in that preforms are stretch-blown in blow molds in a stretch-blowing installation. The preforms as well as the liquid containers made thereof are normally inspected and defective items are segregated, for example, in that the defective items are detected, evaluated and ejected from a series of such preforms or liquid containers running on a conveyor belt.

German patent DE 102 59 589 B3 discloses a method for producing hollow objects made of plastic in that heated preforms are stretch-blown, whereby the preforms are inspected prior to being heated and defective preforms are ejected. In this context, at least some of the defective preforms are heated and are only ejected after being heated, preferably by a sorting station that can be controlled by an inspection station and by an evaluation unit of the inspection station.

German utility model DE 201 14 032 U1 discloses a device for segregating defective preforms. This device includes a controllable sorting member that acts directly on the preforms. The sorting member pushes the preform essentially in the axial direction, thus forcing the neck collar of an individual preform against a bearing surface for the preform. An evaluation unit controls a stationary pneumatic cylinder with a piston rod. If the sorting member receives a segregating signal from the evaluation unit, the pneumatic cylinder moves a tappet pulse-like downwards from its idle position into its ejecting position and then back to its idle position. In this process, the tappet strikes the head of the preform in question, presses it downwards and thus segregates it.

German patent DE 195 16 403 C2 discloses a device with which bottles being transported on a first conveyor belt are selectively transferred to a second conveyor belt. The device includes a tappet that is mounted so as to move back and forth along a straight trajectory, said tappet being driven by a drive into the path of motion of the bottles, thus imparting a given bottle with a motion pulse oriented perpendicular to the conveying direction. When the tappet is driven into the path of motion of the objects, it has a motion component that is directed downwards. Preferably, the tappet is fastened to the piston rod of a pneumatic cylinder that points obliquely downwards and it is installed so as to move between two vertical parallel plates between which the pneumatic cylinder is likewise attached.

German patent DE 27 04 614 discloses a device for distributing upright bottles, comprising a first transporter star and a second transporter star as well as an inlet channel and an outlet channel. Movable pistons are present for pushing the bottles either into the outlet channel of the first transporter star or into an outlet channel of the second transporter star, depending on the piston that has been actuated.

German patent application DE 36 31 879 discloses a device for segregating defective bottles. A deflecting mechanism in the form of a helical spiral, which is actuated by a detection station for defective bottles, imparts the bottles with a motion pulse perpendicular to the running direction of the conveyor. The deflecting mechanism has a motor-driven shaft having a brush segment whose contour lies on a helical spiral ascending in the running direction of the conveyor.

German patent DE 32 04 114 C2 discloses a device for sorting bottles that are standing upright. On one side of a horizontal conveying surface, there is a controllable deflector, for instance, a pneumatically actuated tappet, that diverts certain bottles from a first conveyor belt onto a second conveyor belt situated parallel thereto. A guide surface located on the other side of the conveying surface has a collecting zone that is slanted with respect to the vertical and positioned to the side next to the conveying surface, whereby said collecting zone, together with a support element that engages with the bottom of the bottle, serves to hold in a stable slanted position any bottles that tip over the edge of the conveying surface. In the collecting zone, there is at least one transportation member that runs in the direction of the second conveyor belt and that engages with the slanted bottles.

European patent EP 1 079 120 B1 discloses a compressed-air maintenance unit and German patent DE 102 47 869 B4 discloses a ram cylinder actuated by a pressurized medium and these publications illustrate the basic technologies for segregating elements as cylinder valve units in devices for segregating defective preforms or bottles.

U.S. Pat. No. 3,745,890 describes ram without ram rings. The collaboration between similar materials (ram-cylinder) is known but U.S. Pat. No. 3,745,890 does not disclose that articles should be sorted out and how a ram for sorting out should be arranged.

The German Utility Patent DE 94 07 563 relates to a device for selectively transferring objects transported on a conveyor, especially bottles, to a second conveyor. The downward directed movement component of a ram exercises via friction on a point of impact of the bottle or the like, a downward force, which counteracts with the tilt momentum caused by the horizontal movement component of the ram on the bottle. Further, the impact is mitigated by the downward directed movement component.

When it comes to modern installations for segregating articles, for instance, defective preforms or liquid containers such as bottles or beverage cans, stricter requirements are made of the cycle rate in relation to the throughput or to the segregation of the articles in such an installation. The articles should be quickly transported, processed and segregated in the installation. The segregation is done, for instance, by means of the above-mentioned segregating elements, namely, the cylinders, the cylinder housing, the valves and the pistons installed in the cylinders. The piston sealing elements are configured according to the state of the art so as to create a soft sealing. Soft-sealing materials have relatively high coefficients of friction, which detrimentally places an upper limit on the cycle rate. Moreover, soft-sealing materials quickly turn brittle, tear and become permeable for the medium that flows via the valves or from the cylinder. Besides, an uneven, roughened piston sealing element that displays elevations and projections or the like slides more slowly over the sliding surface of the cylinder housing than an undamaged piston sealing element does. The service life of the damaged piston sealing element and thus the service life of the piston are reduced. Another drawback of soft-sealing materials exists for the sealing elements in the area of the piston since lubricants such as, for example, oils, are employed in order to prevent the soft-sealing materials from becoming roughened, and these oils become gummy due to the fast motion of the piston, in turn, impairing the sliding properties. All in all, the functionality of the sorting procedure of the articles and the cycle rate pertaining to the motions of the piston and thus the entire installation are detrimentally affected.

SUMMARY OF THE INVENTION

It is an object of the present invention to provide a device for segregating articles that ejects individual articles from a series of articles at a higher cycle rate than devices known from the same technical field, that operates more reliably and that is less prone to malfunctioning.

The present invention further provides a device for segregating articles, whereby a plurality of articles on a conveyor belt passes a detection unit in a conveying direction (CD) of the conveyor belt (2), whereby the conveyor belt (2) is associated with a segregating element comprising at least one cylinder with a cylinder housing and a piston installed in the cylinder that has at least one valve, so that, by means of a control unit, a medium can be fed into and discharged from the cylinder via at least one line, whereby the at least one valve and the at least one line interact with each other so as to create a hard sealing, as a result of which the piston can be moved into and out of the cylinder in a piston direction (PD) along at least one sliding surface of the cylinder housing, and so that a hard-sealing housing sealing element is arranged on the at least one sliding surface of the cylinder housing, and at least one piston sealing element is arranged on the piston, characterized in that the at least one piston sealing element is likewise configured so as to create a hard sealing.

As already described above, a plurality of articles passes a detection unit known from the state of the art in a conveying direction of the conveyor belt. The detection unit ascertains the articles that are free of defects and the defective articles that need to be segregated. A segregating element encompassing at least one cylinder with a cylinder housing and a piston installed in the cylinder is associated with the conveyor belt. At least one valve is associated with the piston so that a control unit can feed a medium, for instance, a gas mixture, into and out of the cylinder via at least one line. The at least one valve and the at least one line interact with each other so as to create a hard sealing.

As a result of feeding the medium into the cylinder or discharging the medium from it, the piston can be moved into or out of the cylinder in a piston direction along a sliding surface of the cylinder housing. A hard-sealing housing sealing element is arranged on the sliding surface of the cylinder housing, and a piston sealing element is arranged on the piston. In each case, two surfaces rub or slide against each other when the piston is moved. In this process, the surface of the piston sealing element interacts with the sliding surface of the cylinder housing. If, according to the present invention, the piston sealing element is likewise configured so as to create a hard sealing, this advantageously increases the cycle rate during the segregation of the articles in comparison to piston sealing elements with soft-sealing sealing material. The coefficient of friction of a hard-sealing material is lower, yielding better sliding properties and thus a higher cycle rate during the segregation of the articles using the piston. Moreover, hard-sealing material is sturdier and is more durable, which constitutes another advantage of the invention. Furthermore, when hard-sealing material is employed for the sealing elements, there is no need for oil to lubricate the sliding surfaces, thereby preventing the oil from becoming gummy on the sliding surfaces and thus preventing uneven sliding surfaces.

Accordingly, it is advantageous if the at least one valve and the line interact so as to likewise create a hard sealing, since here, too, two surfaces rub or slide against each other when the appertaining valve is moved. For this purpose, pairs of valve sealing elements and line sealing elements that interact with each other should be made of a hard-sealing material. The line sealing elements are on the lines and the valve sealing elements are on the valves.

In one embodiment of the invention, at least one of the sealing elements on the cylinder housing, piston, valve and/or line is made of a metallic material, for example, steel, especially also stainless steel. As an alternative, the sealing elements can be made of Teflon-coated aluminum, ceramic and/or plastic. These materials are known to be chemically inert, to have low coefficients of friction, to display low adhesion to other materials and to be resistant and thus to be suitable as stable materials for continuous friction of these materials, accounting for a high cycle rate during the segregation of the articles.

For the sake of improved durability, the material of pairs of the above-mentioned sealing elements that interact with each other should have the same hardness, which can be achieved, for example, in that pairs of sealing elements are made of the same material. Particularly the pairs of piston sealing elements and housing sealing elements that are exposed to high friction loads should be made of the same material. For cost reasons, of course, all of the sealing elements can be made of the same material. For the same reason and for cost reasons, the piston can at the same time be the piston sealing element, in other words, in this embodiment, the piston and the piston sealing element form a unit.

Owing to the high friction loads vis-à-vis the piston, it is also recommended for the cylinder housing to be made of a resistant material, for instance, stainless steel (VA steel) or of a resistant plastic, for example, Grivory HT.

BRIEF DESCRIPTION OF THE DRAWINGS

Embodiments of the invention and its advantages will be explained below in greater detail making reference to the accompanying figures. The size relationships of the individual elements with respect to each other as shown in the figures do not always reflect the real size relationships since some shapes have been simplified and other shapes have been depicted in enlarged form relative to other elements for the sake of providing a better overview.

DETAILED DESCRIPTION

Figures 1, 2:
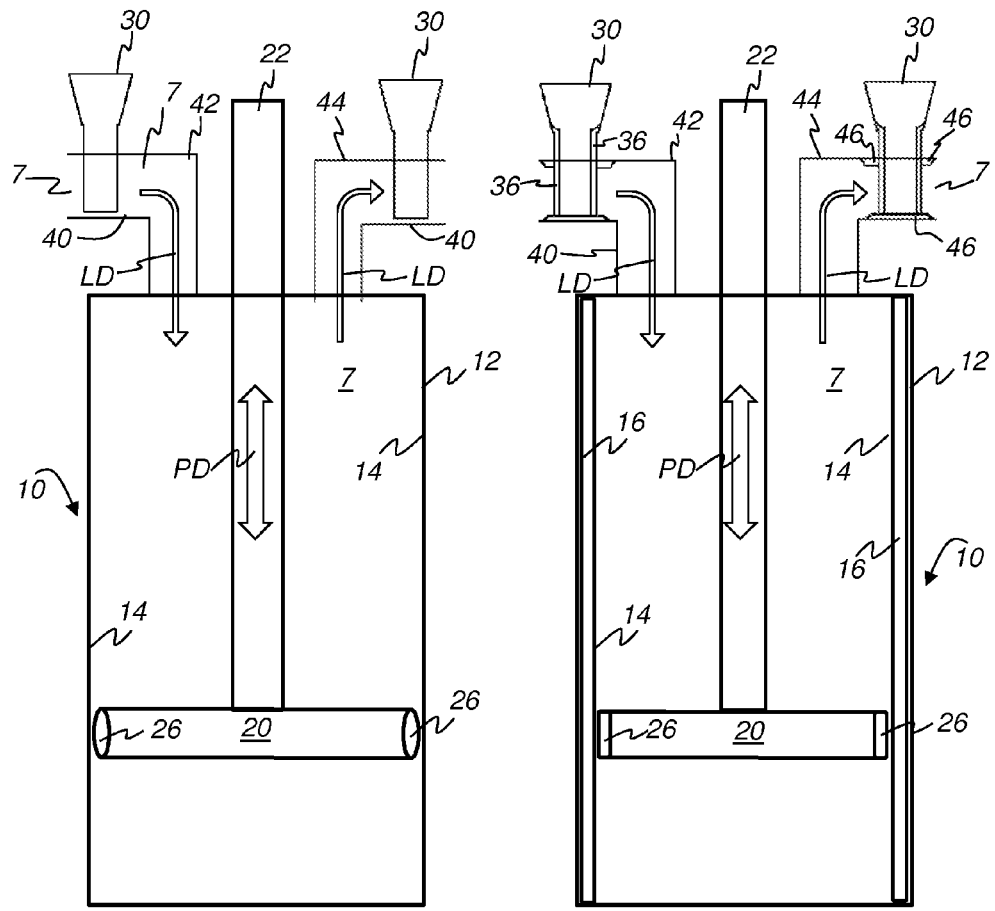
FIG. 1 shows a schematic cross section through a cylinder for a device known from the state of the art for segregating articles.
FIG. 2 shows a schematic cross section through a cylinder for a device according to the invention for segregating articles.

The same reference numerals were used for elements of the invention that are identical or that have the same effect. Moreover, for the sake of clarity, the only reference numerals shown in the individual figures are those that are necessary to describe that particular figure. The embodiments shown constitute only examples of how the device according to the invention or the method according to the invention can be configured and do not constitute a definitive limitation.

Figure 4:
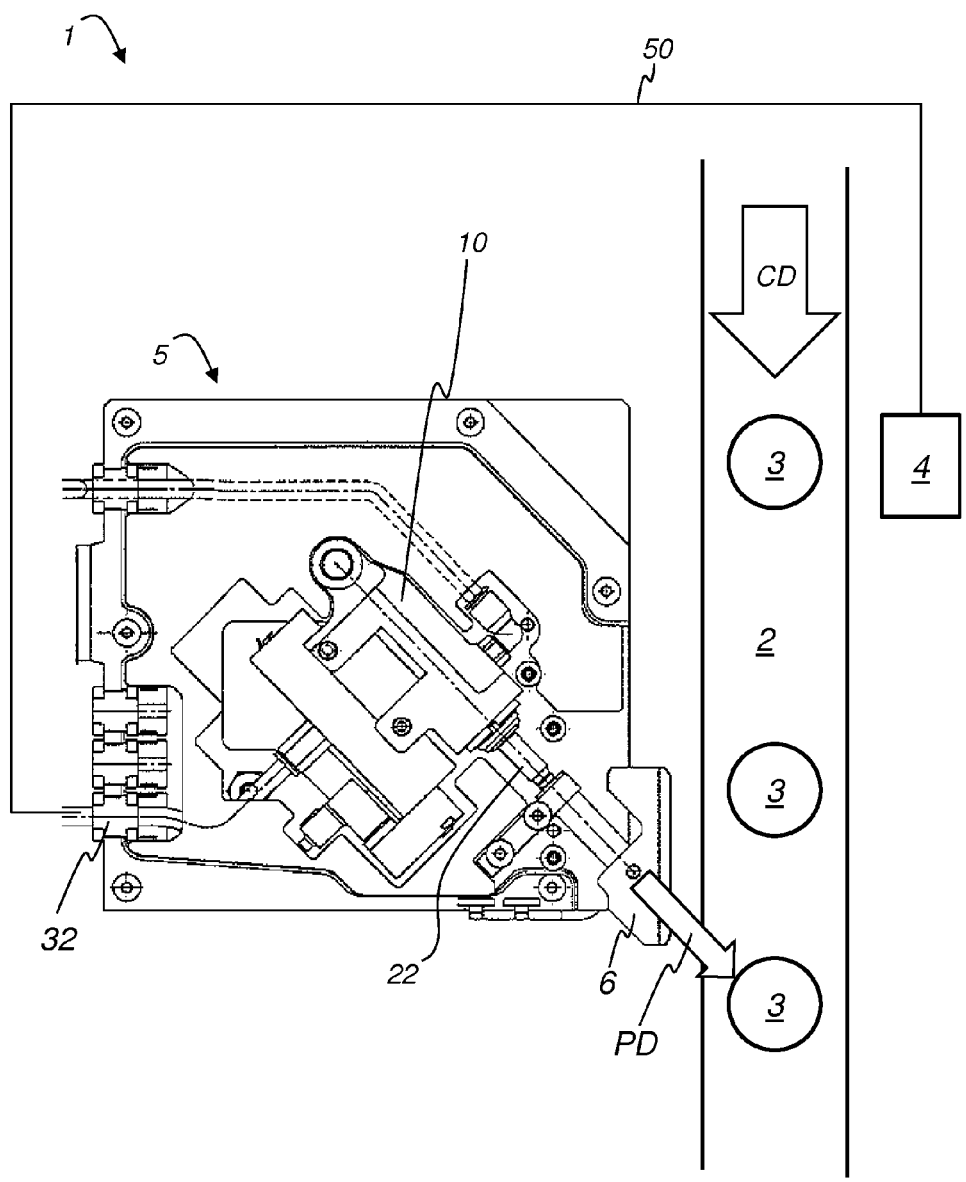
FIG. 4 shows a schematic top view of a device according to the invention for segregating articles.

FIG. 1 schematically shows a cross section through a cylinder 10 for a device 1 known from the state of the art for segregating articles 3 (see FIG. 4). The cylinder 10 is part of a segregating element 5 (see FIG. 4) of the device 1.

Inside the cylinder 10, there is a piston 20 with a piston rod 22 which are both moved in the piston direction PD into or out of the cylinder 10. Articles 3 that have been detected as being defective are pushed off of a conveyor belt 2 (see FIG. 4) by the piston rod 22. Parts of the inner wall of the cylinder housing 12 serve as a sliding surface 14 for the piston 20. According to the state of the art, the piston 20 is provided with a soft-sealing piston sealing element 126 on each of its two ends that make contact with the cylinder housing 12. The piston 20, along with the piston rod 22, slides in the piston direction PD up and down along the two sliding surfaces 14 of the cylinder housing 12, depending on whether a medium 7 is being discharged or fed in. In the embodiment shown here, the cylinder 10 is connected to two valves 30, one serving to feed the medium 7 into the cylinder 10 in a line direction LD via a line 40, and the other valve 30 serving to discharge the medium 7 out of the cylinder 10 in a different line direction LD via another line 40. Accordingly, a feed line 42 leading to the cylinder 10 is configured for the medium 7 in one line 40 and a discharge line 44 leading out of the cylinder 10 is configured for the medium 7 in the other line 40.

FIG. 2 schematically shows a cross section through a cylinder 10 for a device 1 according to the invention for segregating articles 3. Unlike in FIG. 1, the piston sealing element 26 here is made of hard-sealing material for the reasons already explained in depth above. In conjunction with this and likewise as already extensively described above, a housing sealing element 16 likewise made of a hard-sealing material is installed on the inner walls of the cylinder housing 12 of the cylinder 10 for each of the two piston sealing elements 26. The piston sealing elements 26 slide along the housing sealing elements 16 as the piston 20 moves up and down.

As already explained in depth above, preference is likewise given to valve sealing elements 36 and line sealing elements 46 being arranged at the points of contact of the lines 40 with the valves 30, said sealing elements interacting with each other in such a way that no medium 7 or else a defined amount of medium 7 is moved through the appertaining line 40. Preferably, the sealing elements 36, 46 are made of a hard-sealing material.

Figure 3:
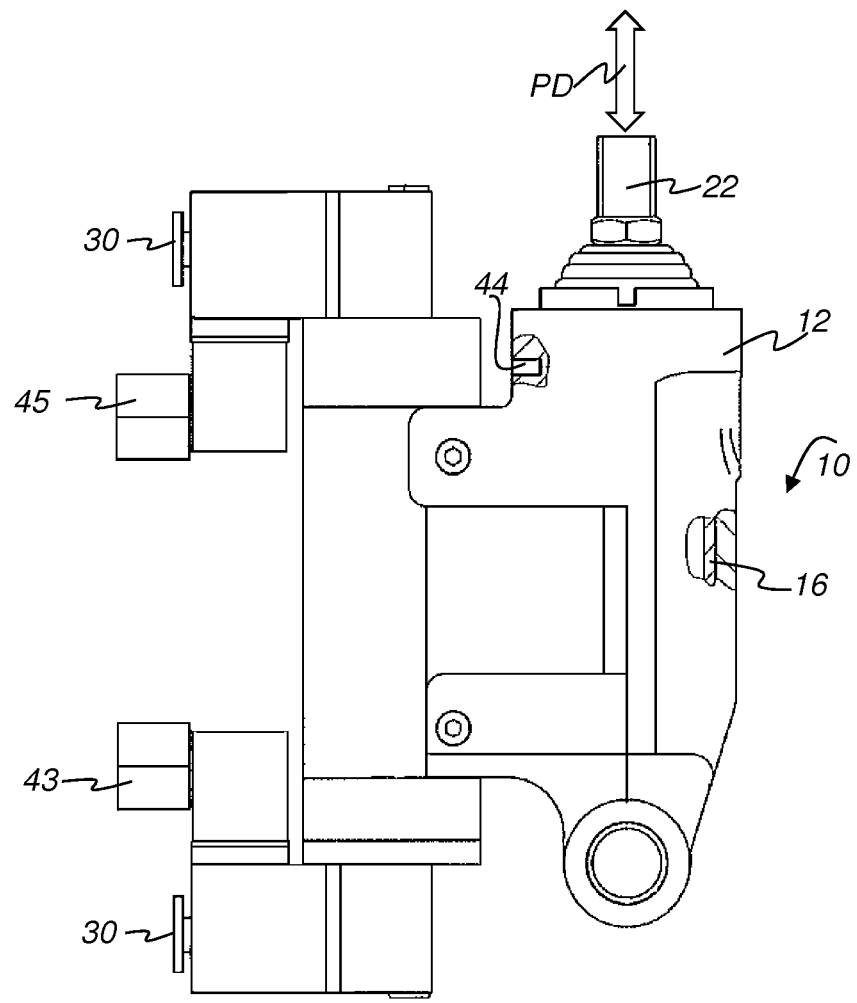
FIG. 3 shows a schematic view of an embodiment of a cylinder that is used for the device according to the invention.

FIG. 3 schematically shows an embodiment of a cylinder 10 that is used for the device 1 according to the invention. A connection 43 for the feed line 42 of the medium 7 and a connection 45 for the discharge line 44 of the medium 7 are provided on the outside of the cylinder 10. The amount of medium 7 to be fed in or discharged is adjusted by means of the two valves 30 as a function of the controlled motion of the piston 20. The position of the housing sealing element 16 is indicated by an opening drawn in the cylinder housing 12. The rod 22 of the piston 20 (not visible in FIG. 3 since it is covered by the cylinder housing 12) protrudes out of the cylinder.

FIG. 4 schematically shows a top view of the device 1 according to the invention for segregating the articles 3. A plurality of articles 3 is transported on the conveyor belt 2 in a conveying direction CD. Defective articles 3 are ascertained by means of a detection unit 4, the resulting data from the detection unit 4 is relayed via a detector line 50 to a segregating element 5 that uses the rod 22 of the piston 20 (not visible in FIG. 4) as well as elements that follow to push the defective articles 3 further in the direction PD until they reach a pusher plate 6. The direction PD is set at an acute angle relative to the conveying direction CD. The articles 3 ejected in this manner by the segregating element 5 fall off the conveyor belt 2. Owing to the advantageous piston sealing elements 26 according to the invention, which are made of hard-sealing material, the piston 20 has very short response times, so that the appertaining articles 3 can be segregated quickly.

The segregating element 5 includes not only the piston 20 and the piston rod 22, but also the cylinder 10 and the valves 30 with the above-mentioned additional elements. The metering of the medium 7 as it is fed or discharged via the valve 30 is regulated by means of the control unit 32.

The invention has been described making reference to a preferred embodiment. However, a person skilled in the art can very well visualize that modifications or changes can be made to the invention without departing from the scope of protection of the claims below. In particular, the cylinder 10 can be connected to more or fewer valves 30 and lines 40, and the conveyor belt 2 can include one or more trajectories without departing from the protective scope of the claims below.

What is claimed is:

1. A device for segregating articles, whereby a plurality of articles on a conveyor belt passes a detection unit in a conveying direction of the conveyor belt, whereby the conveyor belt is associated with a segregating element, the device comprising:
    at least one cylinder with a cylinder housing and a piston installed in the cylinder that has at least one valve, so that, via a control unit, a medium can be fed into and discharged from the cylinder via at least one line, as a result of which the piston can be moved into and out of the cylinder in a piston direction along at least one sliding surface of the cylinder housing, and so that a sealing housing sealing element is arranged on the at least one sliding surface of the cylinder housing, and at least one piston sealing element is arranged on the piston,
    the at least one valve, the at least one line, the housing sealing element and the at least one piston sealing element being configured so as to create a hard sealing,
    the piston having a piston rod with a pusher plate capable of removing defective ones of the plurality of articles, the piston direction forming an acute angle with the conveying direction.

2. The device according to claim 1 wherein the at least one line comprises at least one feed line and discharge line for the medium in each of which a valve is arranged, whereby the line is associated with at least one line sealing element and the valve is associated with at least one valve sealing element which are both configured so as to create a hard sealing.

3. The device according to claim 1 wherein at least one of the housing sealing element and the piston sealing element is made of a metallic material.

4. The device according to claim 3 wherein the metallic material is steel.

5. The device according to claim 1 wherein at least one of the housing sealing element and the piston sealing element is made of Teflon-coated aluminum.

6. The device according to claim 1 wherein at least one of the housing sealing element and the piston sealing element is made of a plastic.

7. The device according to claim 1 wherein at least one of the housing sealing element and the piston sealing element is made of ceramic.

8. The device according to claim 1 wherein the piston sealing element and the housing sealing element are made of the same material.

9. The device according to claim 2 wherein the valve sealing element and the line sealing element are made of the same material.

10. The device according to claim 1 wherein the piston sealing element is integral with the piston.

11. A device for segregating articles, comprising:
a detection unit capable of detecting defectives articles of a plurality of articles on a conveyor belt passing the detection unit in a conveying direction of the conveyor belt; and
a segregating element associated with the conveyor belt, the segregating element including:
at least one cylinder with a cylinder housing and a piston installed in the cylinder that has at least one valve, so that, via a control unit, a medium can be fed into and discharged from the cylinder via at least one line, as a result of which the piston can be moved into and out of the cylinder in a piston direction along at least one sliding surface of the cylinder housing, and so that a sealing housing sealing element is arranged on the at least one sliding surface of the cylinder housing, and at least one piston sealing element is arranged on the piston, the at least one valve, the at least one line, the housing sealing element and the at least one piston sealing element being configured so as to create a hard sealing, the piston having a piston rod with a pusher plate, the piston direction forming an acute angle with the conveying direction, the pusher plate capable of removing articles from the conveyor belt detected as defective by the detection unit.

12. The device according to claim 11 wherein the at least one line comprises at least one feed line and discharge line for the medium in each of which a valve is arranged, whereby the line is associated with at least one line sealing element and the valve is associated with at least one valve sealing element which are both configured so as to create a hard sealing.

13. The device according to claim 11 wherein at least one of the housing sealing element and the piston sealing element is made of a metallic material.

14. The device according to claim 13 wherein the metallic material is steel.

15. The device according to claim 11 wherein at least one of the housing sealing element and the piston sealing element is made of Teflon-coated aluminum.

16. The device according to claim 11 wherein at least one of the housing sealing element and the piston sealing element is made of a plastic.

17. The device according to claim 11 wherein at least one of the housing sealing element and the piston sealing element is made of ceramic.

18. The device according to claim 11 wherein the piston sealing element and the housing sealing element are made of the same material.

19. The device according to claim 18 wherein the valve sealing element and the line sealing element are made of the same material.

20. The device according to claim 11 wherein the piston sealing element is integral with the piston.

* * * * *